Aug. 16, 1932.  M. D. KENNA  1,871,532
DRIVING AND PARKING GUIDE FOR VEHICLES
Filed Feb. 23, 1929
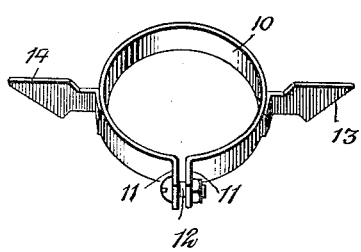
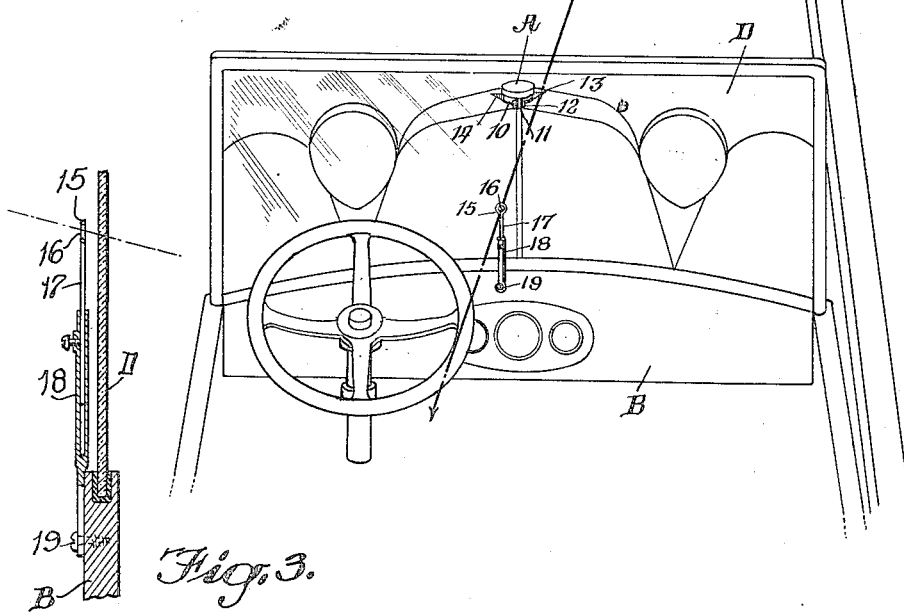
WITNESSES
INVENTOR
Mary D. Kenna
BY
ATTORNEY Patented Aug. 16, 1932

1,871,532

UNITED STATES PATENT OFFICE

MARY DUDLEY KENNA, OF NEW YORK, N. Y.

DRIVING AND PARKING GUIDE FOR VEHICLES

Application filed February 23, 1929, Serial No. 342,190, and in Great Britain June 15, 1928.

This invention relates to an accessory for vehicles, and comprehends an improved driving and parking guide by virtue of which the driver or operator may accurately gauge the path of travel which will be traversed by the wheels in order to assist him in judging distance when passing other vehicles or obstructions and in avoiding contact with the curb when parking.

Primarily, the invention comprehends a driving and parking guide in the nature of a plurality of sights which when lined up by the eye of the operator indicate a path or line of travel which will be followed by the wheels on the side of the vehicle opposite to the driver's seat, it being obvious that the driver may accurately gauge the path of travel of the wheels on the same side as the driver's seat.

The invention further embodies a driving and parking guide of the character set forth which is unobtrusive and hence, does not detract from the appearance of the vehicle, obstruct or obscure the vision of the driver or in any manner interfere with the manipulation of the steering wheel or other control.

Other features of the invention reside in the simplicity of construction and mode of use of the guide, the economy with which it may be manufactured, the facility with which it may be installed and the general efficiency derived therefrom.

With the above recited and other objects in view, the invention resides in the novel construction and arrangement of parts set forth in the following description, illustrated in the accompanying drawing and pointed out in the appended claim, it being understood that variations and modifications which properly fall within the scope of said claim may be resorted to when found expedient.

In the drawing:

Figure 1 is a perspective view of the pointer member constituting one of the elements of the guide.

Figure 2 is a perspective view of the guide elements applied to a motor vehicle and illustrating the mode of use.

Figure 3 is a fragmentary vertical sectional view through the vehicle illustrating the rear sight element in active use.

Referring to the drawing by characters of reference, 10 designates a split ring or collar, the extremities of which project radially outward to provide a pair of apertured ears 11 designed to receive a bolt or other suitable securing means 12 for clamping the ring about the usual filling nozzle A of an automobile. The ring 10 carries at diametrically opposite points, pointers 13 and 14 which project radially outward therefrom. Two pointers are used for the purpose of rendering the device adaptable to vehicles of either the right or left-hand drive and to also render the attachment more symmetrical and ornamental in appearance. It is, of course, obvious that on cars of the left-hand drive type as illustrated, the left-hand pointer is not used. The position 13 or 14 which is employed constitutes a front sight element and the invention further comprehends a rearwardly, upwardly and laterally spaced sight element 15 which defines an aperture 16 and which may be in the nature of a ring carried by a shank 17 which is telescopically associated with an arm 18 which is in turn fulcrumed at 19 to the instrument board B or any other convenient stationary part of the vehicle. The rear sight element is disposed in advance of the eye of the operator and is in a relative position to the tip of the front of the pointer 13 and the eye of the operator when the sights are properly adjusted on the vehicle, so that when aligned a point C is indicated on the road or street in advance of the vehicle which designates the path or line of travel which the wheels on the side of the vehicle opposite from the driver, will traverse if the vehicle is steered in a straight path. Obviously, a vehicle equipped with such a guide means permits the operator to accurately judge distance when passing other vehicles or obstructions while permitting them to avoid undesirale contact of the tires with the curb when parking.

In practice, the essential features of the invention consist in providing front and rear sight elements mounted upon fixed parts of the vehicle and in advance of the eye of the driver, with the rear sight in a plane above the front sight and laterally disposed with respect to the front sight toward that side of the vehicle occupied by the driver, so that when properly aligned by the eye of the driver an imaginary line E extends through the sights to a point C on the ground which indicates closely the track or path of travel which the wheels of the vehicle on the opposite side of the driver will traverse, assuming that the vehicle is steered straight away.

What is claimed is:

A steering gauge for automobiles comprising a front sight consisting of a split ring adapted to be clamped about the radiator filling nozzle and provided with a laterally offset sighting point, said front sighting point being laterally disposed with respect to the center line of the vehicle away from that side occupied by the driver thereof, and a rear sight in advance of the driver and in a plane above the front sight and laterally disposed with respect to the center line of the vehicle toward that side occupied by the driver thereof, said rear sight consisting of an upstanding rod having a sight opening at the upper end thereof, an upstanding socket for said rod carried adjacent the windshield of the vehicle, said rod being vertically adjustable within said socket and said socket being pivotally mounted and adjustable at its lower end whereby to secure transverse adjustment of said rear sight.

MARY DUDLEY KENNA.